Patented Mar. 1, 1938

2,109,944

UNITED STATES PATENT OFFICE 2,109,944

PAPER SIZING

Louis Leonard Larson, Wilmington, Del., assignor to E. I. du Pont de Nemours & Company, Wilmington, Del., a corporation of Delaware No Drawing. Application August 28, 1935, Serial No. 38,327

2 Claims. (Cl. 92—21)

This invention relates to the sizing of paper, and more particularly to the sizing of calcium carbonate filled paper.

By the word "size" as employed herein is meant a water dispersion or emulsion of a water-resistant substance that is used to render paper fibers and filling pigments water-repellent when dry; by "sized" is meant the condition of having been treated with a size; and by "sized paper" is meant paper that is water-resistant.

In the production of printing papers, such as magazine, book, lithograph, etc., a high filler content is used. The fillers most commonly employed are clay and calcium carbonate. In comparison with clay, calcium carbonate imparts greater opacity, better brightness and whiteness of color, and improved resiliency and printing properties. However, a disadvantage of calcium carbonate is that its alkalinity destroys the efficiency of rosin size, and no practical previous method for sizing calcium carbonate filled paper has been developed, so the use of this paper is limited at present to applications where a water-sensitive sheet can be tolerated.

The major difficulties that have been encountered in the sizing of calcium carbonate filled paper are: (1) the destruction of size efficiency by the alkalinity of calcium carbonate, (2) the reaction of calcium carbonate with sizing ingredients to cause the formation of foam that greatly impairs proper sheet formation, and (3) the loss of size efficiency through the presence of a high pigment content in the pulp in the manufacture of highly filled papers. Of these three the first two are encountered only with an alkaline filler such as calcium carbonate, but the last one is also a problem encountered with any filler when used in such amounts that the finished sheet contains 20% or more by weight of pigment.

The use of paraffin and of mixtures or resins with paraffin or with wax has been proposed, but the above mentioned difficulties have not been effectively overcome. Although paraffin is not sensitive to the alkalinity of calcium carbonate, its use has not proved practical for several reasons. In the first place, it weakens the sheet so that breaks frequently occur on the paper machine, such as at the press rolls. Secondy, wax agglomerates tend to collect on the wire and on the felts thus preventing proper sheet formation. Thirdly, practical machine operation has demonstrated that it is not retained well in the sheet during formation of the web so that a hard sized sheet is not produced.

Some of the important properties required in a size for calcium carbonate filled paper are as follows: The size should not be sensitive to the alkalinity of calcium carbonate and it should be capable of imparting water resistance to the paper. The size should fix tenaciously onto the calcium carbonate or the calcium carbonate and the fiber; otherwise it is lost in the white water during sheet formation, and a slack sized sheet results. The size must not cause foaming difficulties on the forming wire. The size must not collect on the forming wire or on the felts. Finally, the size should not weaken the sheet.

This invention has as an object a practical process for the sizing of calcium carbonate filled paper. Another object is to provide an operable process free from foaming difficulties which produces a hard sized sheet of calcium carbonate filled paper even at very high filler contents. Still another object is to provide a process for hard sizing paper containing 20% or more by weight of any filling pigment. Other objects will appear hereinafter.

The above objects are accomplished by the following invention which in its preferred embodiment consists in adding an emulsion of size consisting of plasticized resin to a water slurry of calcium carbonate, precipitating the size on the particles of calcium carbonate, mixing the sized calcium carbonate with paper pulp and forming the pulp into paper by the usual paper making procedure.

After a complete study of a large variety of compositions and methods of application, I have discovered that the above mentioned requirements in a size for a calcium carbonate filled paper may be fulfilled with water resistant resins which, when plasticized with plasticizing agents of the kind disclosed herein, may be properly emulsified in water for admixture with a calcium carbonate slurry and subsequent precipitation of the size on the calcium carbonate particles. Examples of water resistant resins useful in the practice of this invention are cumarone resins, ester gum, damar, rosin, and rosin modified phenol-formaldehyde resins. Of these the best results are obtained with the cumarone resins.

Of the vegetable oils suitable for plasticizing agents for the resin, I have found that China-wood oil either raw or heat bodied is particularly effective. Other drying oils such as linseed oil may, however, be used almost as satisfactorily with some resins, as for instance the cumarone resins. Other agents which may be used to plasticize the resins are mineral oils, either paraffin or naphthenic base, and also certain waxes. In the case of China-wood oil not less than 10% of the oil should be used in treating the resin and the preferred amount is 20% to 30%. Amounts greater than 50% are not desirable. In the case of a mineral oil, the resin-oil compositions should contain at least 20% of oil and the preferred amount is about 30%. Amounts much greater than 40% of mineral oil should not be used because sheet strength and water resistance are impaired. When waxes are used they should have a melting point not much higher than 70° C. and preferably between 40° and 60° C. Examples of suitable waxes are paraffin, Asiatic wax, Japan wax, and hydrogenated oils, such as hydrogenated cottonseed or soya bean oil.

The emulsion of the plasticized resin should be one that is stable in dilute concentration, and one which consists of the size dispersed in a very finely divided state. The sizing effect of the plasticized resin composition is practically lost if these qualities of the emulsion are not satisfied. In view of the requirements just mentioned the emulsions are prepared by first dissolving a plasticized resin in an organic solvent, and then emulsifying this solution in water by means of an active emulsifying agent and agitation; and following this by homogenization in a colloid mill. I prefer to use an active solvent that has a boiling point around 100° C. An aliphatic hydrocarbon such as mineral spirits may be used if it is an active solvent for the resin. Some resins such as cumarone resins require an aromatic hydrocarbon solvent. Mixtures of aliphatic and aromatic solvents may also be used.

In the preferred operation of my process, which consists in treating the calcium carbonate with the size emulsion prior to mixing the calcium carbonate with the paper pulp, I add to the mixture of calcium carbonate slurry and plasticized resin emulsion a solution of a precipitant which insures thorough precipitation of the size solution on the calcium carbonate particles. Suitable precipitants are sulfuric acid, alum, or calcium chloride. The size and the size precipitant are added slowly with thorough agitation of the slurry. The preferred amount of precipitant is 1.7% sulfuric acid, 5% alum, or 5% calcium chloride by weight based on the calcium carbonate although these amounts may be varied appreciably up or down without materially affecting the results. In order to improve the finish and strength of the paper, a solution of starch may also be added to the calcium carbonate slurry preferably after the addition of the size precipitant, or the starch solution may be added to the pulp in the beater.

The treated calcium carbonate slurry is now ready for admixture with paper pulp preparatory to sheet formation. In plant operation the supply of the size slurry is kept ahead of machinery requirements by at least one hour. The advance supply may be regulated at will because the properties of the treated slurry do not change by standing for several hours or longer. During storage, however, the treated slurry should be kept agitated.

The sized calcium carbonate slurry may be added to the paper pulp at any convenient point in the system prior to the sheet forming wire. The only limitation is that the fibers and the calcium carbonate must be uniformly distributed in the water before the stock passes onto the paper machine. The mixing may be carried out in the beater, in the machine chest, or at the regulating box. I prefer to mix in the machine chest or at the regulating box because it is not good paper practice to treat paper pulp with a Jordan in the presence of calcium carbonate. When the mixing is carried out at the regulating box, the calcium carbonate is fed as a continuous stream to the diluting water that goes to the head box to dilute the pulp to a paper making consistency. The quantity of calcium carbonate delivered per unit time is dependent upon the amount of calcium carbonate required in the finished sheet, and for a given amount in the finished sheet the amount of calcium carbonate required in the fiber-calcium carbonate water suspension fed to the paper machine depends upon the freeness of the pulp, the speed of the machine, the amount of suction, etc. In general, the stock furnished to the machine contains from 60% to 130% by weight of calcium carbonate based on the fiber in the production of a highly filled sheet. When the sized calcium carbonate slurry is added at the machine chest the same principle is followed; that is, the slurry is added as a continuous stream during addition of pulp to the machine chest and the amount of slurry depends upon the rate of addition of pulp and the amount of calcium carbonate required in the finished sheet.

For the production of a hard sized sheet, the amount of plasticized resin deposited onto the calcium carbonate is dependent upon the amount of calcium carbonate detained in the finished sheet. For a sheet containing 25% calcium carbonate, a minimum of 5% by weight of plasticized resin should be used based on the calcium carbonate. Below 5% the size efficiency drops off quite rapidly, although as low as 4% will give a medium sized sheet. Smaller amounts may be used for the production of a slack sized sheet.

The following examples are given to illustrate the invention but not to limit its scope thereby.

*Example I*

The beater furnish consists of 80 parts of soda pulp, 20 parts of bleached sulfite pulp (air dry basis), and the usual amount of water. The beaten pulp is dropped to the beater chest, from which it is pumped to the Jordan engine. The Jordan-treated pulp is discharged into the machine chest, from which it is pumped to the regulating box. At the regulating box the pulp is diluted to a paper making consistency with water containing sized calcium carbonate in suspension. The stock is screened and then formed into paper on a paper machine.

The calcium carbonate is sized as follows: To 100 parts of a 17.8% water slurry of calcium carbonate (pH 7.8 to 9.0) is added 35.6 parts of a 3% emulsion of cumarone resin plasticized with heat bodied China-wood oil. This is followed by the addition of 17.8 parts of a 1.7% solution of sulfuric acid, and then 26.7 parts of a 4% solution of a heavy boiling corn starch. The calcium carbonate slurry is well agitated during the mixing operation. The slurry is thinned with 100 parts of water and discharged into a storage chest from whence it is pumped to the diluting water going to the regulating box. The volume of this sized slurry delivered per unit time to the diluting water is regulated so that the finished sheet contains the required amount of calcium carbonate.

The 3% emulsion of cumarone resin-China wood oil blend is prepared as follows: 70 parts of a cumarone resin such as V-½ cumar and 30 parts of a heat bodied China-wood oil (viscosity of Y at 77° F. on the Gardner-Holdt scale) are blended at 140° C., and to this blend are added 10 parts of linseed oil acids and 50 parts of solvent consisting of equal parts by weight of toluene and xylene. This solution at 110° C. is added together with 40 parts of a 5% solution of ammonium hydroxide to 800 parts of water at 95° C., which is agitated during the mixing operation by means of a high speed stirrer. The emulsion thus formed is homogenized by passing it twice through a colloid mill. The emulsion is finally diluted to a 3% cumar-China wood oil concentration by stirring in 2,333 parts of water at 70-80° C.

A 40-pound basis weight (25 x 38 x 500 ream) sheet containing 25% by weight of calcium carbonate prepared as above has a water resistance of 18 seconds by the standard dry indicator test. A 50-pound basis weight sheet containing 19% by weight of calcium carbonate has a water resistance of 26 seconds. The sheet requires several hours' aging after it comes off the paper machine before its maximum water resistance is developed. The stock operates on the machine without any difficulty from foaming, or from collection of size on the wire or felts. The size increases the strength of the paper.

Example II

A beater is furnished with 50 parts of soda pulp, 50 parts of bleached sulfite pulp, and the usual amount of water. After the pulp has been given the desired amount of beating, the beater roll is raised and a sized calcium carbonate slurry is added. This sized calcium carbonate slurry is prepared as follows: 130 parts of a 3% rosin-China wood oil emulsion, 65 parts of a 1.7% solution of sulfuric acid, and 65 parts of a 5% solution of a heavy boiling corn starch are added in the order given to 650 parts of a 10% calcium carbonate slurry, with thorough agitation of the calcium carbonate slurry during the mixing operation. After addition of this slurry to the beater, agitation is continued until the calcium carbonate is well mixed with the fiber. The charge is then removed from the beater and diluted with water to a paper making consistency. Sheets are formed in a standard way, pressed, and dried at 100-110° C.

A 55-pound basis weight sheet containing 25% by weight of calcium carbonate has a water resistance of 42 seconds by the dry indicator test.

The 3% rosin-China wood oil emulsion is prepared as follows: 60 parts by weight of rosin and 40 parts by weight of heat bodied China-wood oil (viscosity of Y at 77° F. on Gardner-Holdt scale) are blended at 140° C. 10 parts of linseed oil acids, 25 parts of toluene and 25 parts of xylene are added to the blend. This solution is emulsified, homogenized, and diluted by the procedure described under Example I.

Example III

A 3% cumarone resin-mineral oil emulsion was substituted for the one used in Example II. The emulsion used in the present example was prepared as follows: 70 parts of V-½ cumar resin, 30 parts of a mineral oil, such as naphthenic base petroleum, and 10 parts of linseed oil acid are blended at 140° C. and then dissolved in 50 parts of solvent consisting of equal parts by weight of xylene and toluene. This solution is emulsified, homogenized, and diluted by the same procedure given under Example I.

A 60-pound basis weight sheet containing 25% calcium carbonate has a water resistance of 31 seconds by the dry indicator test.

Example IV

The procedure given under Example II was carried out with an emulsion of resin plasticized with Asiatic wax (M. P. about 60° C.).

A 57-pound basis weight sheet containing 25% calcium carbonate thus sized with rosin plasticized with Asiatic wax has a water resistance of 26 seconds. Another modification is the use of waxes with oils for plasticizing the resin.

The wax used in the foregoing example may be replaced with Japan wax, paraffin, hydrogenated oils such as hydrogenated cotton seed oil or soya bean oil. The resins may also be plasticized with a mixture of wax and oil.

When the calcium carbonate in the foregoing examples is replaced with neutral or acid filling pigments, such as clay or calcium sulfite, hard sized papers are produced even at very high pigments contents (20 to 30% by weight). The paper will have a water resistance at least 40% greater than when rosin size is used in place of the size emulsion of this invention.

The introduction of the size into the system consisting of calcium carbonate and paper making fibers in the form of pulp or sheet may be accomplished in many ways. For example, the size may be added to a fiber-calcium carbonate suspension in the beater, in the beater chest, or in the machine chest. Another possible method is to add all of the size to part of the calcium carbonate, thus having for sheet formation a water suspension of fiber, sized calcium carbonate, and unsized calcium carbonate. In addition to the incorporation of sized calcium carbonate with the pulp, it may be added to the web on the Fourdrinier paper machine by allowing the bottom part of the guide roll to run in a bath of sized calcium carbonate slurry. Thus, the roll carried sized slurry to the wire, from which it is absorbed by the wet web.

The use of broke or old paper stock as part of the beater furnish does not have any detrimental influence on the successful operation of the process. Neither is the alkalinity of the calcium carbonate slurry before treatment with size of any particular importance on the successful operation of the process. For example, the alkalinity of the calcium carbonate slurry before treatment may be 7.8 up to 10.5 or even higher. If the slurry is quite alkaline, however, the amount of size precipitant should be increased so that the sized slurry has an alkalinity around pH 8.0 or lower.

The invention is useful in the manufacture of papers highly filled with pigments, such as calcium carbonate or clay. These papers are particularly useful in the printing industry.

It will be apparent from the foregoing that I have provided a process for the production of a hard sized sheet of calcium carbonate filled paper which is practicable, free from foaming difficulties, not influenced by the alkalinity of calcium carbonate, and which strengthens rather than weakens the paper.

As many apparently widely different embodiments of this invention may be made without departing from the spirit and scope thereof, it is to be understood that I do not limit myself to the specific embodiments thereof except as defined in the appended claims.

I claim:

1. A process for manufacturing sized calcium carbonate filled paper which comprises preparing a solution in volatile organic solvent of oil-plasticized resin, emulsifying the solution of the plasticized resin with water and an emulsifying agent, homogenizing the emulsion until the plasticized resin is contained therein in the finely divided state obtainable by homogenization in a colloid mill, adding the emulsion thus prepared to a water slurry of calcium carbonate, precipitating the plasticized resin on the calcium carbonate, mixing the sized calcium carbonate with unsized paper making fibers, and making the mixture of said calcium carbonate and unsized pulp into paper.

2. The process set forth in claim 1 in which said plasticized resin is cumarone resin plasticized with China-wood oil.

LOUIS LEONARD LARSON.